March 20, 1928.
K. MAYBACH
FREE WHEEL MECHANISM
Filed July 22, 1924
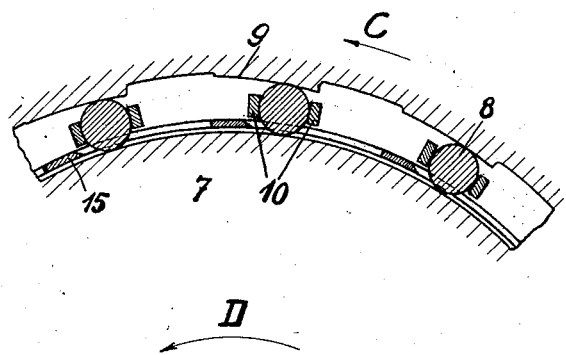
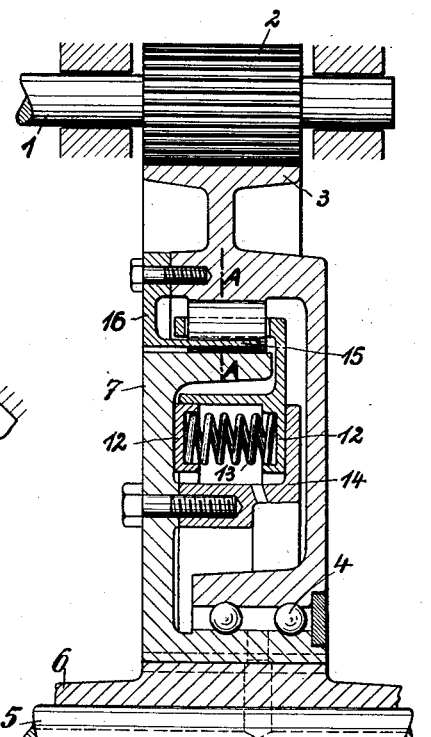
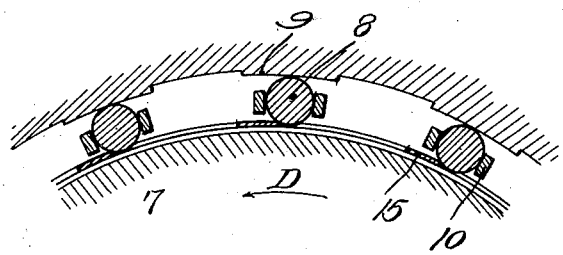
Inventor:
Karl Maybach Patented Mar. 20, 1928.

1,663,380

UNITED STATES PATENT OFFICE.

KARL MAYBACH, OF FRIEDRICHSHAFEN, GERMANY, ASSIGNOR TO MAYBACH MOTORENBAU GESELLSCHAFT MIT BESCHRÄNKTER HAFTUNG, OF FRIEDRICHSHAFEN, BODENSEE, GERMANY.

FREE-WHEEL MECHANISM.

Application filed July 22, 1924, Serial No. 727,599½, and in Germany August 13, 1923.

My invention relates to free-wheel mechanism, and more especially to over running clutches employed in starting devices, for motor vehicles.

In free-wheel clutches rollers or balls are used as means of transmission. They are situated between two surfaces, one belonging to the driven part, the other to the driving part of the clutch. When in operation they are pressed against both surfaces so as to cause the driven part to rotate with the driving part by means of the friction between the transmitting members and the surfaces of both parts. When out of operation they run freely between both surfaces.

According to my invention I provide means for bringing the transmitting members into a neutral position where they are out of contact with one of the surfaces. This affords an easy running and it has the further advantage that there is no wear of the transmitting members while out of operation. I attain this effect by aid of a friction-disc, which causes the transmitting members automatically to be brought out of contact with the originally driven part after the latter has overrun the driving part. For this purpose the friction disc is connected with the cage containing the transmitting members (balls or rollers) and it will move this cage so as to bring the transmitting members into contact with corresponding wedge-shaped members which are in rigid connection with the stopping part of the clutch, thereby causing the transmitting members to be removed from the surface of that part of the clutch which is to retain rotation, after having overrun the other part which then will stop or move with lower speed.

I prefer to have springs acting on the friction-disc. It may be advisable to provide two friction-discs within the rotating part of the clutch instead of one, these two having springs arranged between them.

Having given a general description of my invention, I now want to point it out more in detail, referring to the drawings which represent an example embodying my invention.

Fig. 1 is a vertical section through the upper half of a free-wheel mechanism.

Fig. 2 is a corresponding partial section taken at right angles to the section of Fig. 1 and along line A—A of this latter figure.

Fig. 3 is similar to Fig. 2 but shows the parts in the positions taken when the driven member is overrunning.

Shaft 1 of a starting device of any well-known construction by means of pinion 2 drives spur wheel 3 which rotates on balls 4 running on the outer face of the hub of wheel 7 which is fixed to hub 6 keyed to the motor shaft 5. Between the inner circumferential face of wheel 3 and the outer circumferential face of wheel 7 the free-wheel mechanism is situated comprising the transmitting elements, rollers 8, kept in a cage 10, working in connection with the slightly inclined surfaces 9 so that while wheel 3 is driving in the direction of arrow C the rollers 8 are jammed between the outer circumferential face of wheel 7 and the inclined faces of wheel 3 thereby transmitting the rotation to wheel 7.

As soon as the motor revolutions cause wheel 7 to overrun wheel 3 rollers 8 are no longer jammed between the two aforementioned surfaces. Wheel 3 then tends to stop. Two friction discs 12 in rigid connection with cage 10 are caused to rotate together with wheel 7 by means of springs 13 which press them against the disc of wheel 7 and against an oppositely situated disc 14 connected to wheel 7. This rotation will be stopped as soon as the rollers 8 are pressed against wedge-shaped projections 15 projecting from piece 16 which is in rigid connection with wheel 3. Thus the rollers 8 are removed from the outer surface of wheel 7 by means of said wedge-shaped projections. Wheel 7 then will have a free run. The inner hollow space of the whole arrangement will be kept under oil pressure so as to have sufficient lubrication for the rollers 8 and the friction discs 12. As soon as wheel 3 again becomes the driving member the projections 15 automatically will be withdrawn from underneath the rollers 8 so that these will again be jammed between the corresponding faces of wheels 7 and 3, as described above, and they will cause wheel 7 to rotate with wheel 3.

I do not want to limit myself to the details described or shown in the drawings, as many variations will occur to those skilled in the art.

What I claim is:

1. A free-wheel mechanism comprising a driving member; a driven member; rolling members arranged between corresponding faces of said first two members, said rolling members being adapted to transmit rotation from said driving member to said driven member; and a disc in frictional connection with said driven member; said disc being adapted automatically to lift said rolling members from the face of said driven member after said driven member has overrun said driving member.

2. A free-wheel mechanism comprising a driving member; and a driven member; an outer ring surface on one of said members corresponding to an inner ring surface on the other member; rolling members arranged between said two surfaces adapted to transmit rotation from said driving member to said driven member; and a disc in frictional connection with said driven member; said disc being adapted automatically to lift said rolling members from the face of said driven member after said driven member has overrun said driving member.

3. A free-wheel mechanism comprising a driving member; a driven member; and rolling members arranged between two corresponding and oppositely situated ring surfaces of said first two members; one of said surfaces being smooth, the other one being subdivided in its circumference into individual portions; the shape-giving lines of said portions being eccentric to that of said smooth surface, so that the gaps between the smooth surface and the said portions all increase in width in the turning direction of the driven and driving members; said rolling members being situated in said gaps and having a diameter smaller than the widest parts of said gaps and bigger than their narrowest parts, and a disc in frictional connection with said driven member; said disc being adapted automatically to lift said rolling members from the face of said driven member after said driven member has overrun said driving member.

4. A free-wheel mechanism comprising a driving member; a driven member; and rolling members arranged between two corresponding and oppositely situated ring surfaces of said first two members; one of said surfaces being smooth the other one being subdivided in its circumference into individual portions; the shape-giving lines of said portions being eccentric to that of said smooth surface, so that the gaps between the smooth surface and the said portions all increase in width in the turning direction of the driven and driving members; said rolling members being situated in said gaps and having a diameter smaller than the widest parts of said gaps and bigger than their narrowest parts; projections rigidly connected to said driving part and sideways projecting into said gaps; said projections being adapted automatically to lift said rolling members from the face of the driven member after said driven member has overrun said driving member.

5. A free-wheel mechanism comprising a driving member; a driven member; and rolling members arranged between two corresponding and oppositely situated ring surfaces of said first two members; one of said surfaces being smooth the other one being subdivided in its circumference into individual portions; the shape-giving lines of said portions beings eccentric to that of said smooth surface, so that the gaps between the smooth surface and the said portions all increase in width in the turning direction of the driven and driving members; said rolling members being situated in said gaps and having a diameter smaller than the widest parts of said gaps and bigger than their narrowest parts; projections rigidly connected to said driving part and sideways projecting into said gaps; and a disc in frictional connection with said driven member; said disc being adapted automatically to lift said rolling members from the face of said driven member after said driven member has overrun said driving member.

6. A free-wheel mechanism comprising a driving member; a driven member; and rolling members arranged between two corresponding and oppositely situated ring surfaces of said first two members; one of said surfaces being smooth, the other one being subdivided in its circumference into individual portions; the shape-giving lines of said portions being eccentric to that of said smooth surface, so that the gaps between the smooth surface and the said portions all increase in width in the turning directions of the driven and driving members; said rolling members being situated in said gaps and having a diameter smaller than the widest parts of said gaps and bigger than their narrowest parts, projections rigidly connected to said driving part and sideways projecting into said gaps; said projections being wedge-shaped so as automatically to lift said rolling members from the face of the driven member after said driven member has overrun said driving member.

7. A free-wheel mechanism comprising a driving member; a driven member; and rolling members arranged between two corresponding and oppositely situated ring surfaces of said first two members; one of said surfaces being smooth, the other one being subdivided in its circumference into individual portions; the shape-giving lines of said portions being eccentric to that of said smooth surface, so that the gaps between the smooth surface and the said portions all increase in width in the turning direction of the driven and driving members; said rolling members being situated in said gaps and having a diameter smaller than the widest parts of said gaps and bigger than their narrowest parts; projections rigidly connected to said driving part and sideways projecting into said gaps; said projections being wedge-shaped; and a cage for said rolling members; said cage being in frictional connection with said driven member.

In testimony whereof I affix my signature.

KARL MAYBACH.